United States Patent [19]
Mols et al.

[11] Patent Number: 5,165,446
[45] Date of Patent: Nov. 24, 1992

[54] SINGLE-LEVER MIXING VALVE

[75] Inventors: Helmut Mols, Wickede/Ruhr; Norbert Ronzon, Balve, both of Fed. Rep. of Germany

[73] Assignee: Knebel & Rottger GmbH & Co., Iserlohn, Fed. Rep. of Germany

[21] Appl. No.: 839,807

[22] Filed: Feb. 21, 1992

[30] Foreign Application Priority Data

Feb. 21, 1991 [DE] Fed. Rep. of Germany ....... 4105387

[51] Int. Cl.⁵ .............................................. F16K 11/78
[52] U.S. Cl. ............................. 137/625.17; 137/625.4; 137/636.2; 137/636.3
[58] Field of Search ........... 137/625.17, 625.4, 625.41, 137/636, 636.2, 636.3, 636.4

[56] References Cited

U.S. PATENT DOCUMENTS 4,687,025 8/1987 Kahle et al. .................... 137/625.17
4,705,072 11/1987 Egli ............................... 137/625.17

FOREIGN PATENT DOCUMENTS 3427959 7/1984 Fed. Rep. of Germany.

Primary Examiner—John Rivell
Attorney, Agent, or Firm—Herbert Dubno; Andrew M. Wilford

[57] ABSTRACT

A single-lever mixing valve has a housing, a cartridge fixed in the housing and having an actuating element pivotal about an element axis for adjusting flow through the cartridge, and an actuating shaft centered on the element axis, fixed in the actuating element, and having a first end formed with an axially open threaded bore and an opposite second end formed with an axially oppositely open grooved seat. The ends of the shaft are generally flush with an outer surface of the cartridge. An actuating lever has first and second connecting pins extending along the element axis and juxtaposed with the respective ends of the shaft. A screw projecting through the first pin and threaded into the bore of the first shaft end fixes the first pin to the first shaft end relative to the element axis. An adapter has an inner end nonrotatably fitted but axially displaceable in the grooved seat of the second shaft end and an outer end juxtaposed with the second pin of the actuating lever. This outer end is releasably fixed on the second pin of the lever.

9 Claims, 4 Drawing Sheets

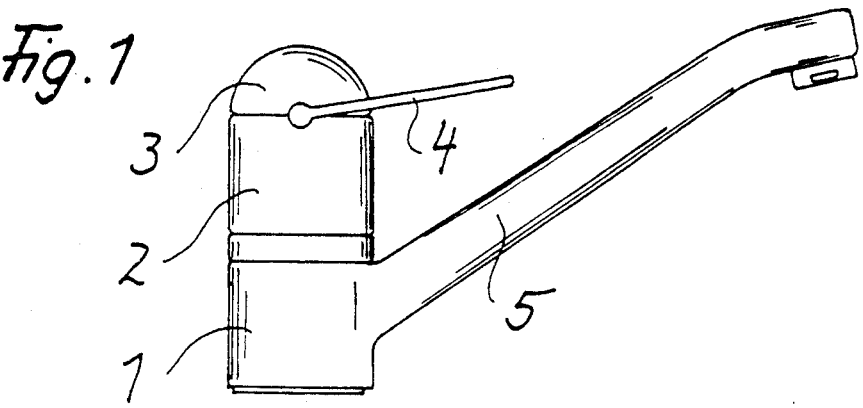
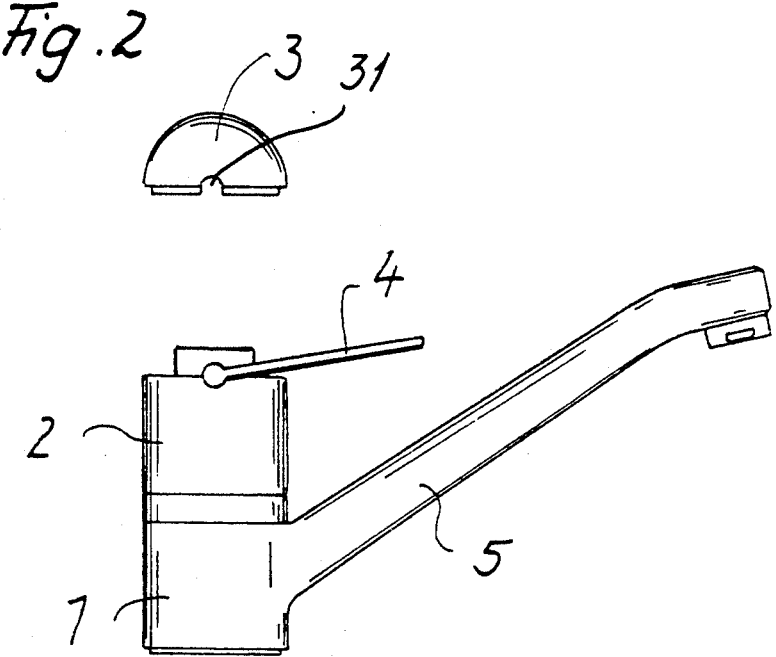

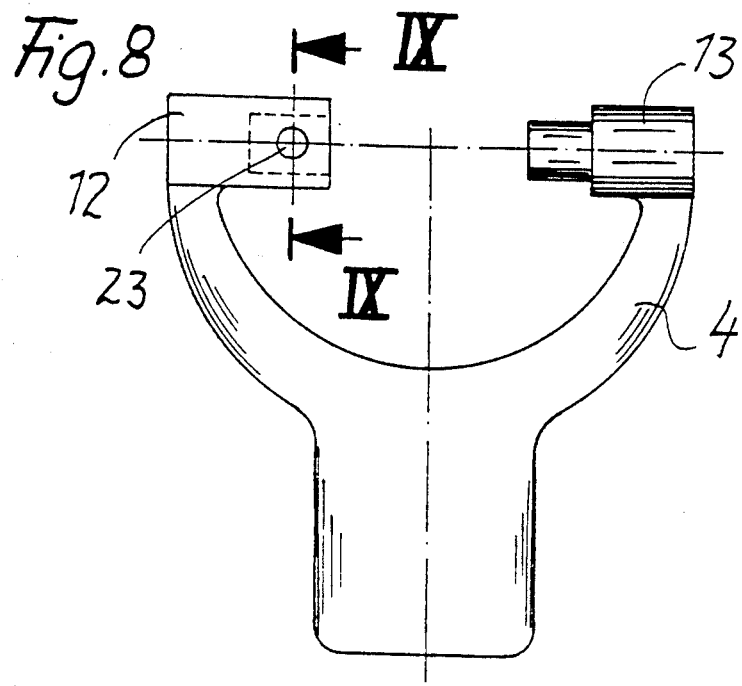
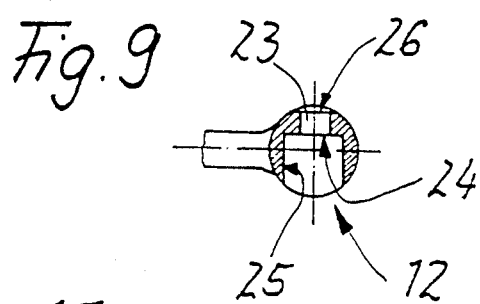
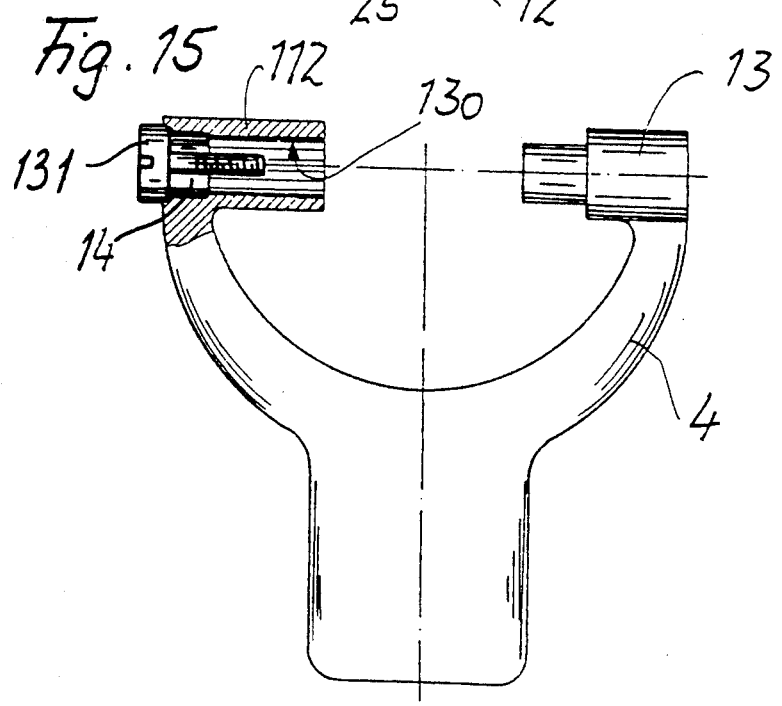

SINGLE-LEVER MIXING VALVE

FIELD OF THE INVENTION

The present invention relates to a mixing valve. More particularly this invention concerns a single-lever mixing valve.

BACKGROUND OF THE INVENTION

A standard single-control mixing valve has a housing in which is provided a ceramic-plate valve cartridge in turn having an actuating element that can be pivoted about a normally horizontal element axis to control flow volume through the valve and that can also be pivoted about a normally vertical axis to control the temperature of the water flowing out of a faucet fed by the valve. An actuating shaft fixed to the actuating element is coupled at each of its ends to a lever that is shaped like a two-tine fork with a pair of end pins each connected to a respective end of the actuating shaft.

As described in German patent document 3,427,95 filed on 28 July 1984 by Helmut Zwink and Hans Oberdorfer the actuating shaft projects at both ends beyond the sleeve and cap that cover the valve housing and enclose the cartridge. These shaft ends are each of square shape and fit into complementary seats in the end pins of the actuating fork.

In order to accommodate some difference in the length of the shaft from valve model to model as well as in the spacing between the end pins of the actuating fork it is standard to leave some play in the fit between the end pins and the actuating shaft. This play must be provided at some remove from where the actuating shaft is seated in the cartridge actuating element, so that with use the play increases, getting so loose and sloppy that with time the end pins can fall right off the shaft ends. The holes where the shaft end project through the casing formed by the sleeve and cap are also fairly loose to compensate for poor manufacturing tolerances and therefore are also sites where water can get into the valve.

OBJECTS OF THE INVENTION

It is therefore an object of the present invention to provide an improved single-control mixing valve.

Another object is the provision of such a improved single-control mixing valve which overcomes the above-given disadvantages, that is which is compact and where the lever is solidly mounted without significant play on the valve-actuating shaft.

SUMMARY OF THE INVENTION

A single-lever mixing valve according to the invention has a housing, a cartridge fixed in the housing and having an actuating element pivotal about an element axis for adjusting flow through the cartridge, and an actuating shaft centered on the element axis, fixed in the actuating element, and having a first end formed with an axially open threaded bore and an opposite second end formed with an axially oppositely open grooved seat. The ends of the shaft are generally flush with an outer surface of the cartridge. An actuating lever has first and second connecting pins extending along the element axis and juxtaposed with the respective ends of the shaft. A screw projecting through the first pin and threaded into the bore of the first shaft end fixes the first pin to the first shaft end relative to the element axis. An adapter has an inner end nonrotatably fitted but axially displaceable in the grooved seat of the second shaft end and an outer end juxtaposed with the second pin of the actuating lever. This outer end is releasably fixed on the second pin of the lever.

Thus with this system the first pin is axially fixed to the first end of the actuating shaft and the second pin is rotationally but not axially fixed to the second shaft end. In this manner the lever is very solidly mounted, with no sensible play whatsoever, but the assembly can still tolerate some differences in shaft lengths and/or distances between lever-pin ends. The lever can be made relatively massive and easy to use with this arrangement since the lever does not need to be deformed to mount it in place.

According to the invention the housing has a housing axis intersecting and extending generally perpendicular to the element axis and is provided with a sleeve and a cap both centered on the housing axis and meeting at a plane generally at the element axis. This cap and sleeve form at the element axis a pair of apertures through which the pins pass. The apertures are of a diameter slightly larger than a diameter of the respective pins and the pins are provided with seal rings filling the holes around the pins.

The shaft according to the invention is stepped with a shoulder bearing axially against the actuating element. The second pin of the actuating lever has a radially and axially inwardly open notch into which the outer end of the adapter fits and a screw is engaged radially through the second pin into the outer adapter end. The outer adapter end and notch have flatly engaging surfaces transfixed by the fixing-means screw. Furthermore the first pin is formed with an axially outwardly open pocket in which the screw is recessed and the lever is provided with a cap covering the pocket. With this structure it is possible to install the lever by moving it radially of the element axis into position, then fastening the two pins to the first shaft end and outer adapter end.

In another arrangement according to the invention the adapter is of uniform axially ridged cross section and the second pin is formed with a seat of the same cross section as the seat of the outer adapter end. The adapter fits in both seats and may be axially fixed in the adapter or lever by a snap ring, set screw, or the like. In this arrangement the seat of the second pin is an axially throughgoing passage of uniform section and the adapter is provided with an axially outwardly open threaded bore so that a screw can be screwed into the adapter bore to withdraw the adapter from the seats.

BRIEF DESCRIPTION OF THE DRAWING

The above and other objects, features, and advantages will become more readily apparent from the following, it being understood that an feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is a small-scale side view of a faucet equipped with the valve according to the invention;

FIG. 2 is a partly exploded view of the assembly of FIG. 1

FIG. 8 is a top view of the actuating lever of the valve;

FIG. 9 is a section taken along line IX—IX of FIG. 8;

FIG. 15 is a partly sectional top view of the actuating lever of the valve of FIG. 10.

SPECIFIC DESCRIPTION

Figure 3:
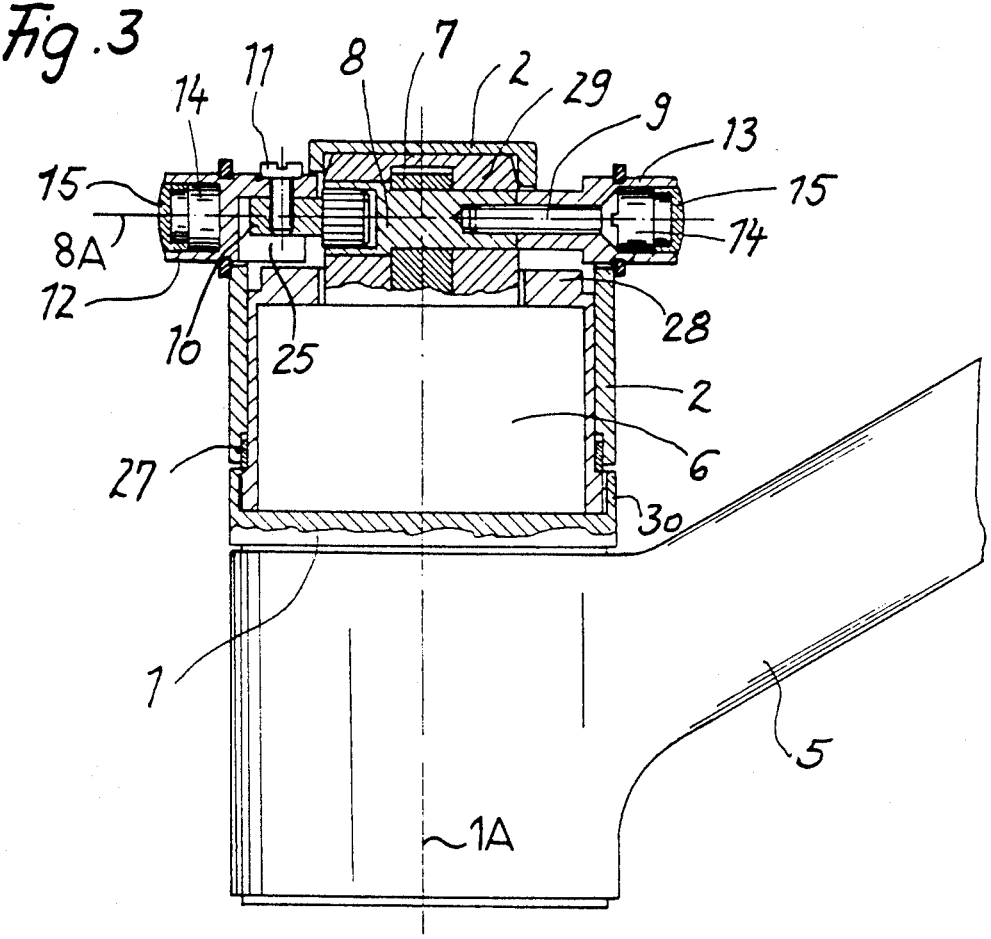
FIG. 3 is a larger-scale partly sectional side view of the valve of this invention.

As seen in FIGS. 1 through 3 the assembly according to this invention has a housing 1 centered on a normally upright axis 1A and provided with faucet 5 and with unillustrated connections for incoming hot- and cold-water lines. A standard ceramic-plate valve cartridge 6 is held in the housing 1 by a hold-down cup 28 threaded at 30 into the housing 1. A stem 29 projecting up from the cartridge 6 contains an actuating member 7 into which is force-fitted an actuating shaft 8 centered on a normally horizontal axis 8A perpendicular to and intersecting the axis 1A. The ends of the shaft 8 are flush with the respective side surfaces of the actuating member 7. A sleeve 2 centered on the axis 1A is rotatable on a ring 27 on the housing 1 and a cap 3 fits into the top of this sleeve 2 to hide and protect the valve cartridge 6. An operating lever 4 linked to the shaft 8 can be pivoted up and down about the axis 8A to control the volume of water issuing from the faucet 5 and can be pivoted from right to left about the axis 1A, taking with it the sleeve 2 and cap 3, to control the temperature of the water as is well known in the art.

Figure 6:
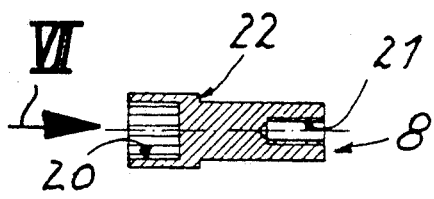
FIG. 6 is a longitudinal section through another detail of FIG. 3.
Figure 7:
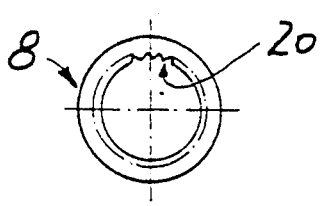
FIG. 7 is a view taken in the direction of arrow VII of FIG. 6.
Figure 10:
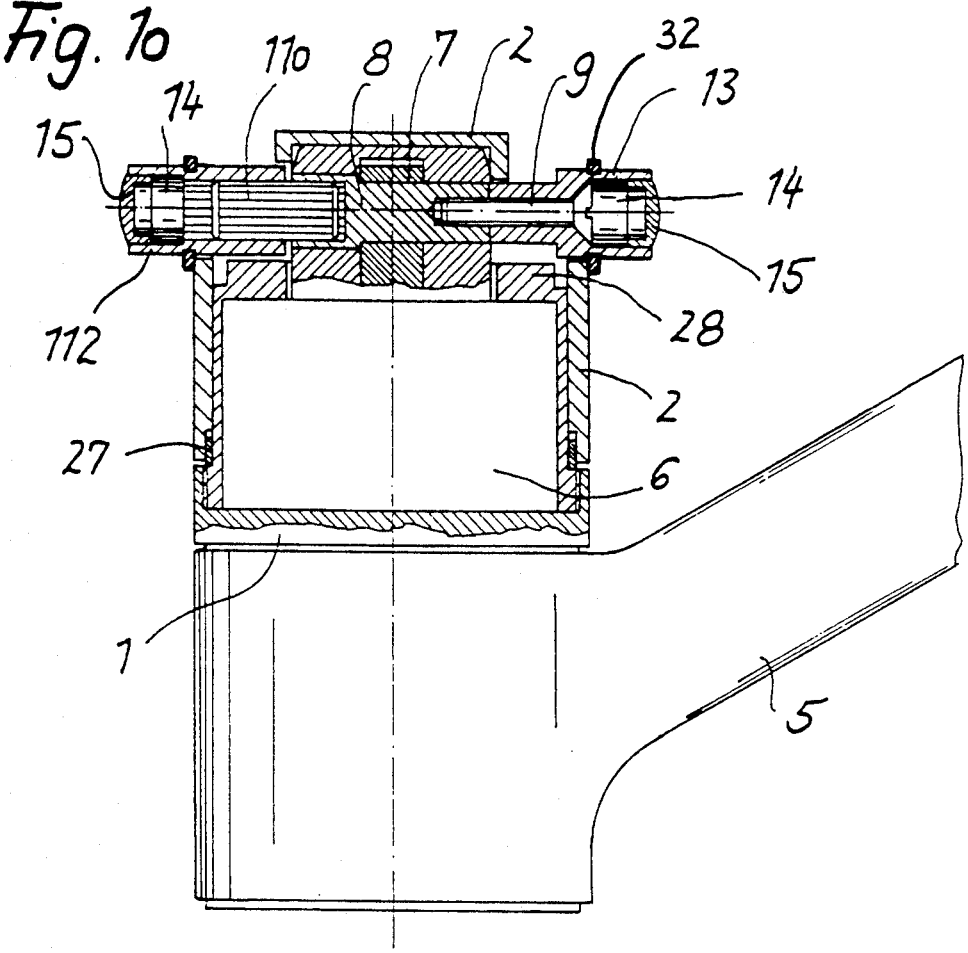
FIG. 10 is a view like FIG. 3 of another arrangement according to the invention.
Figure 11:
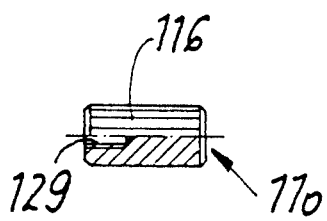
FIG. 11 is a partly sectional side view of a detail of FIG. 10.
Figure 12:
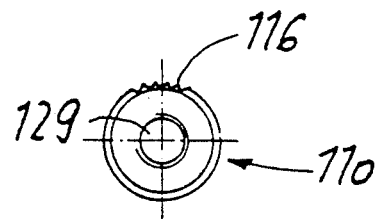
FIG. 12 is a larger-scale end view of the detail of FIG. 11.
Figure 13:
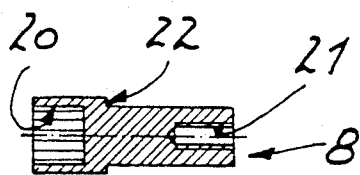
FIG. 13 is a side sectional view of a detail of FIG. 10.
Figure 14:
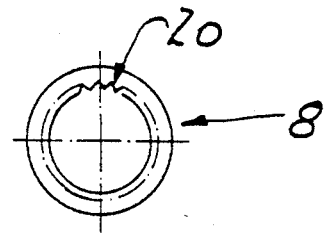
FIG. 14 is a larger-scale end view of the detail of FIG. 13.

The lever 4 is basically formed as a fork with a pair of coaxial pins 12 and 13 axially aligned with each other and with the axis 8A. The shaft 8 as shown in FIGS. 6 and 7 has a seat 20 formed with internal axially extending splines and open axially toward the pin 12 and at its axially opposite end an axially centered threaded bore 21 open toward the pin 13. A shoulder 22 formed on the shaft 8 bears against the respective side of the lever 7 into which this shaft 8 is force fitted.

Figure 4:
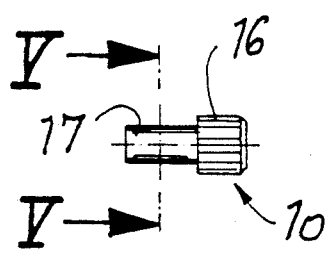
FIG. 4 is a side view of a detail of FIG. 3.
Figure 5:
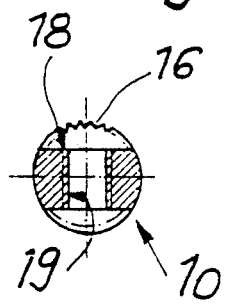
FIG. 5 is a section taken along line V—V of FIG. 4.

An adapter 10 shown in FIGS. 4 and 5 has a large-diameter splined end 16 complementary to and fittable in the seat 20 and a small-diameter stem 17 formed with a diametrally throughgoing threaded bore 18 terminating at a face 18. The pin 12 as shown in FIG. 9 is formed with a notch or pocket 25 that can be fitted over the stem 17 with a flat face 24 of the pocket 25 lying on the face 18 of the stem 17. A screw 11 engages through a hole 23 formed in the pin 12 and into the bore 19 to pull the faces 18 and 24 together, align the pin 12 coaxially with the shaft 8, and rotationally couple the pin 12 and the lever 4 to the shaft 8. The screw 11 has a head that rests on a flat 26 of the pin 18 when it is screwed tight into the bore 19.

A screw 9 extends on the axis 8A from the pin 13 into the threaded blind bore 21 of the shaft 8 to maintain the pin 13 and the shaft 8 coaxial. A pocket 14 on the pin 13 receives the head of the screw 9 and is closed by a decorative cap 15. For appearance's sake, a similar such axially outwardly open pocket 14 is provided on the pin 12 with its own cap 15.

Thus the lever 4 is mounted on the shaft 8 by two screws 9 and 11. Removal of the cap 15 of the pin 13 gives access to the screw 9 to allow its removal and removal of the cap 3 similarly gives access to the screw 11 so it can be pulled to take the lever 4 off.

The pins 12 and 13 are of slightly smaller diameter than the apertures through which they pass. These apertures are formed by semicircular notches 31 in the cap 3 and sleeve 2 which meet at a plane at the axis 8A. Normally seal rings 32 are provided on the pins 12 and 13 at these holes.

In the arrangement of FIGS. 10 through 15, where parts identical to those of FIGS. 1 through 9 are identically referenced, an adapter 110 is used which is of uniform cross section and formed along its entire length with axially extending splines 116 of the same size and shape as the wide splined end 16 of the adapter 10. The lever 4 has a pin 112 formed with an axially throughgoing splined passage 130 complementary to the adapter 110. Thus to assemble this arrangement the cap 15 on the pin 112 is removed and the adapter 110 is pushed through the hole 114 into the seat 20 of the shaft 8, then the screw 9 is mounted from the other side through the pin 13 as in the arrangement of FIGS. 1 through 9.

The adapter 110 is formed with an axially centered and outwardly open threaded bore 129. Thus to take apart the assembly a screw 131 is threaded through the hole 14 into the bore 129 and is tightened so its head bears on the pin 12 and pulls the adapter 110 out.

We claim:

1. A single-lever mixing valve comprising:

a housing;

a cartridge fixed in the housing and having an actuating element pivotal about an element axis for adjusting flow through the cartridge;

an actuating shaft centered on the element axis, fixed in the actuating element, and having a first end formed with an axially open threaded bore and an opposite second end formed with an axially oppositely open grooved seat, the ends of the shaft being generally flush with an outer surface of the cartridge;

an actuating lever having first and second connecting pins extending along the element axis and juxtaposed with the respective ends of the shaft;

a screw projecting through the first pin, threaded into the bore of the first shaft end, and fixing the first pin to the first shaft end relative to the element axis;

an adapter having an inner end nonrotatably fitted but axially displaceable in the grooved seat of the second shaft end and an outer end juxtaposed with the second pin of the actuating lever; and releasable means fixing the outer end of the adapter on the second pin of the lever.

2. The mixing valve defined in claim 1 wherein the housing has a housing axis intersecting and extending generally perpendicular to the element axis and is provided with a sleeve and a cap both centered on the housing axis and meeting at a plane generally at the element axis, the cap and sleeve forming at the element axis a pair of apertures through which the pins pass.

3. The mixing valve defined in claim 1 wherein the apertures are of a diameter slightly larger than a diameter of the respective pins and the pins are provided with seals filling the holes around the pins.

4. The mixing valve defined in claim 1 wherein the shaft is stepped with a shoulder bearing axially against the actuating element.

5. The mixing valve defined in claim 1 wherein the second pin of the actuating lever has a radially and axially inwardly open notch into which the outer end of the adapter fits, the releasable fixing means being a screw engaged radially through the second pin into the outer adapter end.

6. The mixing valve defined in claim 5 wherein the outer adapter end and notch have flatly engaging surfaces transfixed by the fixing-means screw.

7. The mixing valve defined in claim 1 wherein the first pin is formed with an axially outwardly open pocket in which the screw is recessed, the lever being provided with a cap covering the pocket.

8. The mixing valve defined in claim 1 wherein the adapter is of uniform axially ridged cross section and the second pin is formed with a seat of the same cross section as the seat of the outer adapter end, the adapter fitting in both seats.

9. The mixing valve defined in claim 8 wherein the seat of the second pin is an axially throughgoing passage of uniform section and the adapter is provided with an axially outwardly open threaded bore, whereby a screw can be screwed into the adapter bore to withdraw the adapter from the seats.

* * * * *